Aug. 11, 1931.   S. M. WEISBERG   1,818,178
TIRE INFLATION DEVICE
Filed May 7, 1930    2 Sheets-Sheet 2
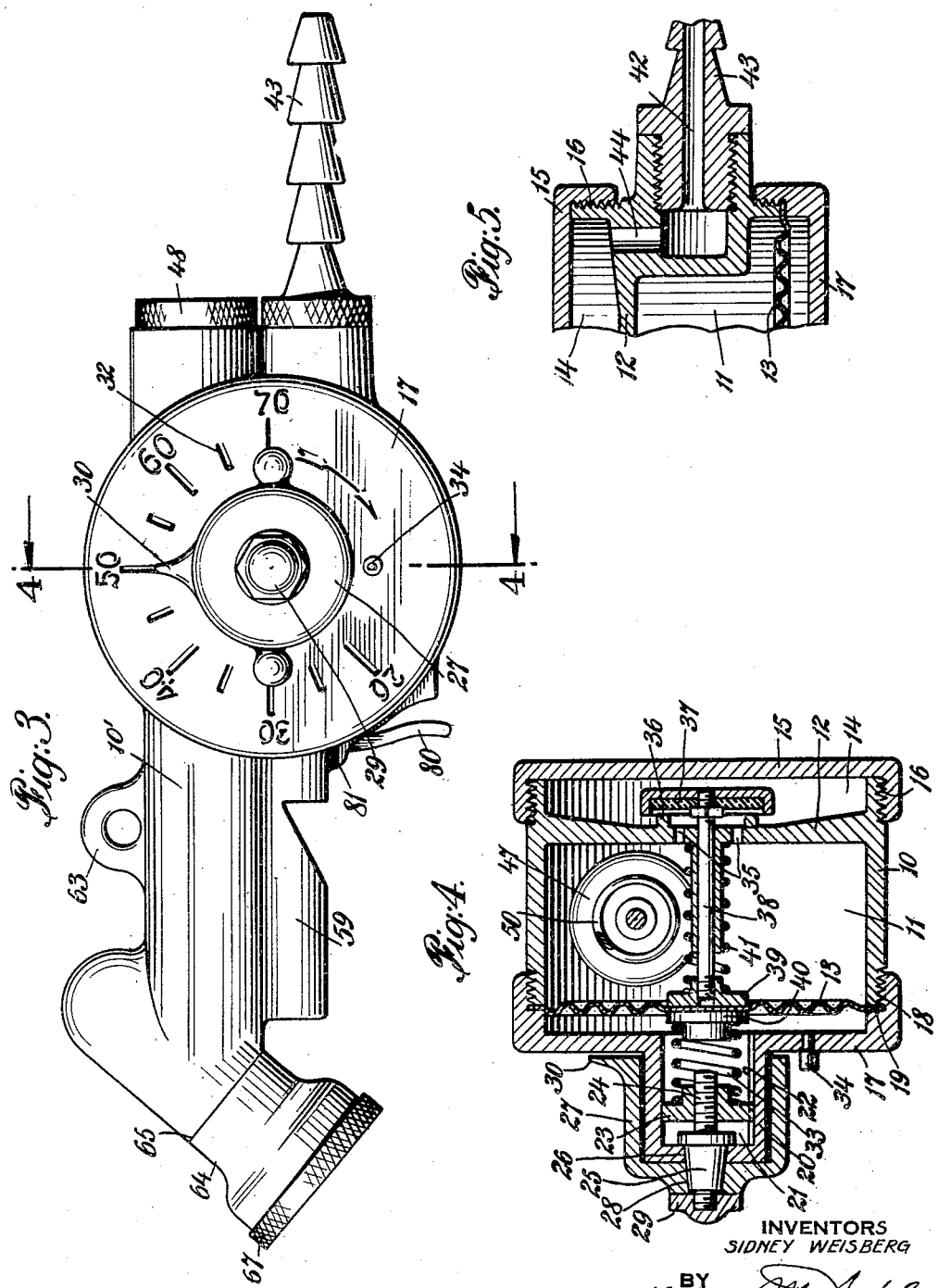
INVENTORS
SIDNEY WEISBERG
BY
Frank M. Ashley
ATTORNEY Patented Aug. 11, 1931

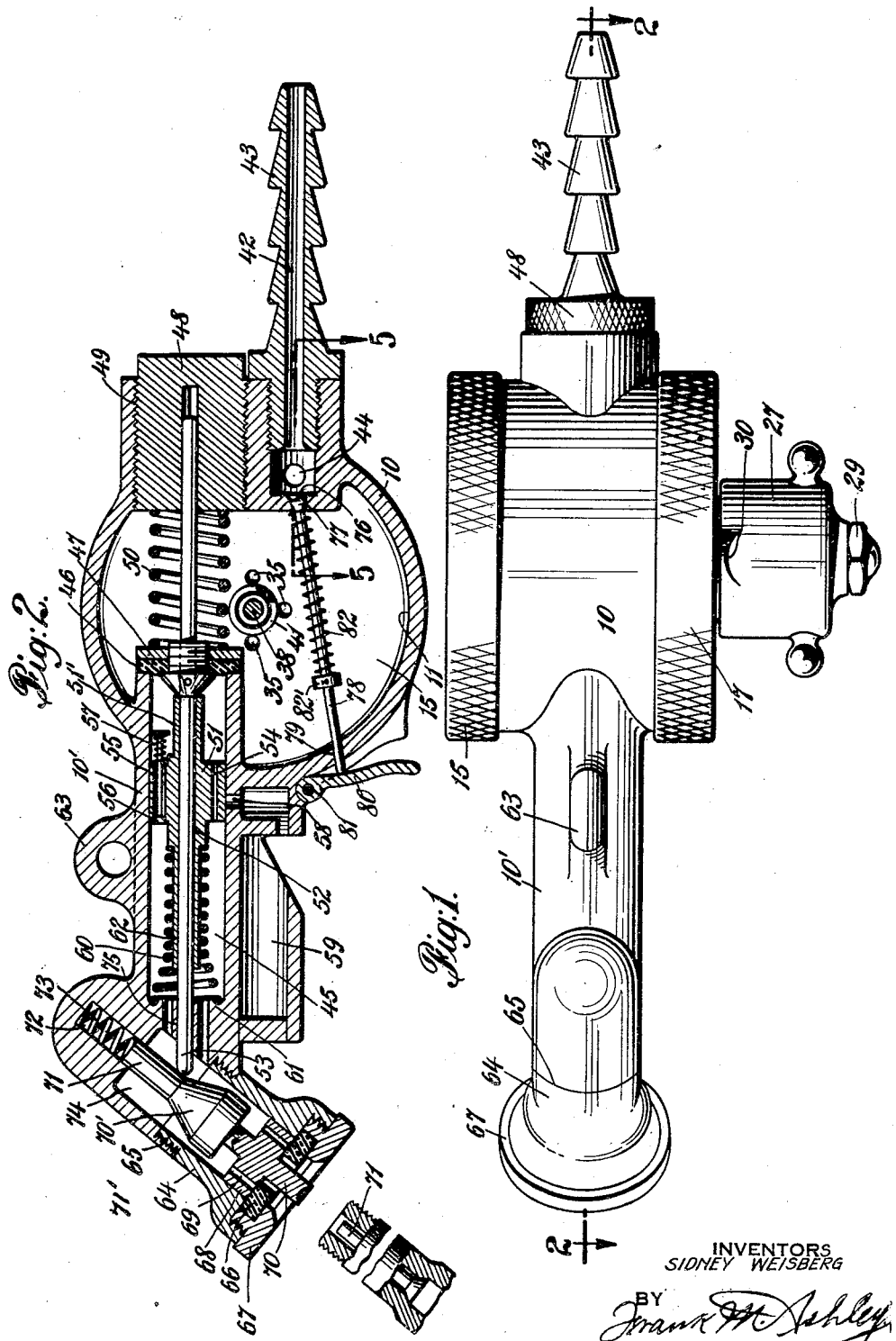

1,818,178

UNITED STATES PATENT OFFICE

SIDNEY M. WEISBERG, OF BROOKLYN, NEW YORK, ASSIGNOR TO NATHAN CHIRELSTEIN, OF NEWARK, NEW JERSEY

TIRE INFLATION DEVICE

Application filed May 7, 1930. Serial No. 450,521.

This invention relates to valve constructions for use in inflating pneumatic tires.

The object of this invention is to provide an automatic valve mechanism by means of which pneumatic tires may be automatically inflated by air to a predetermined pressure only, and will automatically operate a signal when said degree of pressure is reached.

A further object is to provide means for reducing the pressure of air below that of the supply line, to any desired degree in a chamber formed in the device or located between the source of supply and the outlet valve of the device, and means for indicating the pressure of air in said chamber.

A further object is to provide means whereby the air may flow directly from the source of supply into said expansion chamber by way of a by-pass valve, to permit an empty tire to be inflated rapidly during the early part of the filling operation to save time.

Further objects of this invention will be hereinafter set forth in the following description.

The subject matter of this application is closely related to that set forth in my applications for patent Serial Numbers 469,988 and 510,730 respectively.

Referring to the drawings which form a part of this specification;

Fig. 1 is a plan view of the top side of the device, shown on an enlarged scale.

Fig. 2 is a longitudinal sectional view of the device on the median line thereof.

Fig. 3 is a side view of the casing on which is mounted the cover of a reducing valve, having a dial calibrated to indicate the air pressure in the expansion chamber of the device, which is the pressure at which the tire is to be inflated, as indicated by a pointer or hand carried by a knob formed integral therewith.

Fig. 4 is a cross sectional view taken on line 4—4 of Fig. 3.

Fig. 5 is a fragmental sectional view of the inlet end of the reducing valve portion of the device.

10— indicates the reducing valve casing of the device, preferably made of brass or aluminum cast in the form substantially as shown, and having an expansion chamber 11— which is closed on the outside by a partition 12— and on the opposite side by a diaphragm 13—.

A chamber 14— is formed between the partition 12— and a cap 15— which is secured to the casing 10— by a screw thread 16—. A housing cap 17— is secured to the casing by a screw thread 18—, and clamps the diaphragm 13— to the casing 10— at 19—, as shown. Formed integral with the housing cap 17— is a cylindrical extending portion 20— having a chamber 21— in which a longitudinally extending groove 22— is formed. A disc 23— is guided by the inner wall of the chamber 21— and is provided with an extending portion which fits into the groove in sliding relation therewith, to prevent the disc 23— from rotating. The center of the disc is provided with a threaded hole in which a screw 24— fits, the rotation of which moves the disc longitudinally in the chamber 21—. A cone-shaped nut 25— is seated in the opening 26— formed in the end of the portion 20—, and carries a cylindrical knob 27— held in adjustable relation thereto, at 28—, and secured in its adjusted position by a nut 29— which screws on the end of the screw 24— which extends thru the nut 25— as shown.

The knob 27— is provided with a pointer 30— and a projecting finger-rest 31—, all formed integral with the knob 27—. A dial 32— is formed in the surface of the cap 17— and graduated from 20— to 70— to indicate lbs. pressure at which the device is set to control.

A helical spring 33— is interposed between the disc 23— and diaphragm 13—, the tension of which is controlled by means of the knob 27—. A vent hole 34— is provided in the cap 17— to admit air to the diaphragm. Holes 35— extend through the partition 12—, and a valve-seat 36— is formed on the partition adjacent thereto. A valve 37— is adapted to rest on said seat and control ingress of air to the chamber 11— from the chamber 14—.

The valve 37— is carried on a valve-stem

38— which extends to and carries a nut 39— which bears against the inner face of the diaphragm. A bearing plate 40— is carried on the end of the spring 33— and is located opposite the nut 39— as shown.

A helical spring 41— abuts the inner side of the partition 12— at one end and the back of the plate 39— at its opposite end, to exert a light pressure against the diaphragm 13—.

42— indicates the air inlet passage formed in the shank 43— adapted for an air hose connection. The air flows from the source of supply thru passage 42—, and passage 44— formed in the partition 12—, into the chamber 14— and thru the valve 37— into the expansion chamber 11—, and is maintained therein at the pressure at which the valve is set, as indicated by the pointer 30— on the dial 32—.

10'— indicates a casing extension, preferably formed integral with the reducing valve casing 10—, and a cylinder 45— is formed therein. A valve seat 46— is formed at one end of said cylinder, and a valve 47— is adapted to rest in said seat and close communication between the expansion chamber 11— and cylinder 45—.

A plug 48— screws into the threaded opening 49— formed in the casing 10—, the central median line of which is in alignment with the central line thru the cylinder 45— and said opening is large enough to pass the valve 47— therethru in the operation of assembling. A helical spring 50— is interposed between the back of the valve 47— and inner end of the plug 48—.

A piston 51— is fitted to slide in the cylinder 45—, and is provided with a smooth central bore 52— thru which extends a valve stem 53— of the valve 47— in close sliding relation.

The piston is provided with a restricted air passage 54— of less area than that of the air passage thru the valve in the tire to be inflated. A passage 55— for air is also formed in the piston and is controlled by a valve 56— normally held to its seat by a spring 57— which is interposed between the end of the valve-stem and the opposite side of the piston as shown.

The piston overlies and normally closes a passage 58— leading from the cylinder to a whistle 59— carried on the under side of the casing extension 10'—. A helical spring 60— is located between the piston and end wall 61— of the cylinder. The piston is provided with a tubular extension 51'— which normally abuts the face of the valve 47— when said valve is closed, and a similar tubular extension 62— limits the movement of the piston in its movement toward the wall 61— so that the opening 58— is not uncovered by the piston when moving in this direction. A ring 63— is formed integral with the casing 10'— by means of which it may be suspended from a hook or other support when not in use.

An outlet nozzle comprising a nipple 64— is connected with and disposed at an angle to the casing 10'— as shown, by a screw joint 65, and is provided with a valve seat 66— of soft rubber, which is held in position by the nut 67.

The valve comprises a metal disc 68— having one or more holes 69— extending therethru, which are closed by the rubber seat when the valve is in its closed position as shown, and a stem 70— extends therefrom to open the valve 71— in the tire being inflated, in the usual manner.

Formed integral with the valve 68— is a conically shaped member 70'— having a cylindrical projecting guide stem 71— formed integral therewith which slides in a bore 72.

A spring 73— bears against the top end of the stem 71— to hold the valve 68— to its seat. Below the cone 70'— the sides are formed cylindrical as shown. The valve-stem 53— extends thru the end wall 61— into the chamber 74— and abuts the upper end of the cone as shown.

The end of the stem 53— is guided in a bore 75— formed in the end wall 61—, and holes 76— lead thru the end wall from the cylinder 45— to the chamber 74—.

I wish to here state that the reason for using the piston 51— and valve 47— with their complementary springs, etc., is solely for the purpose of operating a whistle or audible signal 59—. By dispensing with the whistle and closing the opening 58— we may use the remaining elements as herein combined, to properly inflate a tire, to the proper degree, and in some cases I prefer to so construct this device.

The means provided for adjusting the pressure on the diaphragm comprising the spring 33— and knob 27— is important, since the air pressure in the chamber 11— may be determined by a pressure gage known to be correct, and the knob 27— can then be loosened from the cone 25— and set so that the pointer 30— indicates the corresponding pressure on the dial 32—.

76— indicates a passage for air leading from the main air supply line into the expansion chamber 11—, and a valve 77— controls said passage. The valve 77— is carried on a valve-stem 78— which extends thru the casing at 79— and abuts a manually operated lever 80— which is hinged to the casing at 81. A helical spring 82— is carried on the valve-rod 78— and abuts the ring 82'— carried on the rod, at one end, and the casing at its opposite end, to hold the valve 77— to its seat.

By pressing on the lever, the valve is opened to pass the air thru to the tire in the process of inflating the same, and by reason of the higher pressure obtained in the expansion chamber, the time required to fill the tire to a pressure below the maximum, is reduced.

The operation is as follows:

Assuming the piston and valve 47— to be removed from the casing, and the opening 58— closed: air at high pressure from a source of supply is admitted to chamber 14— by way of passages 42— and 44—, and flows thru the valve 37— into the expansion chamber 11— and therefrom to the outlet valve 68—, filling the chambers with air at the pressure as governed by the reducing valve mechanism.

When the pressure in the chamber 11— is high enough to move the diaphragm 13— far enough against the action of the spring 33—, the valve 37— is closed. Assuming the pressure is to be maintained at 50 lbs. per square inch gage pressure as indicated on the dial 32—, and the nozzle valve is opened to admit air into the tire thru the valve located therein, the air would flow from the chamber 11— into the tire until the pressure of air in the tire equalled that of the pressure in the chamber 11— and could go no higher, due to the control of the reducing valve diaphragm.

When the nozzle is removed from the tire, the valve 68— will close, and air will fill the chambers at a pressure of 50 pounds. We will now assume that the piston and valve 47— together with their auxiliary parts are placed in the casing and adjusted as illustrated in the drawings: the air will flow into the chamber 11— as previously described, but cannot pass the valve 47— until it is manually opened by movement transmitted from the stem 70— thru cone 70'— and valve stem 53— in the act of admitting air to the tire thru the tire valve, in the usual manner.

It must be remembered that the area thru the tire valve located in the tire valve is very small, and that the area thru the air passages 54— and 55— combined, is less than that of the valve tire passage, and that the pressure of the spring 60— is just sufficient to move the piston to its extreme position adjacent the valve 47— when the air pressure in the tire is equal to the pressure in the expansion chamber, the spring 60— then forcing the piston projection 51'— against the valve 47— while held in its open position, will slide past the opening 58—, and air will pass therethru and blow the whistle.

The use of the check valve 56— is to permit a larger volume of air to pass thru during the early portion of the tire inflation period, to reduce the time required in filling but this valve can be dispensed with if desired, and the area of the passage reduced as hereinbefore set forth.

When the valve 68— is forced open, the sides 71'— abut the end of the rod 53—, and holds the valve 47— in locked open position, thus reducing the pressure required to hold the device in position during the inflation period.

The valve 47— and cone for operating it may also be dispensed with if desired, the central bore thru the piston being closed; this permits the use of the whistle, as the operation is the same, except that the said valve 47— gives additional security against leakage.

It must also be remembered that the construction herein illustrated is but about ⅓ as large as shown in the drawings. It is obvious that the details of construction may be changed without departing from the invention disclosed and I therefore do not wish to limit myself to the exact construction shown, but may make such changes as may be necessary or desirable within the scope of my invention as defined by the claims.

Having thus described my invention I claim as new:

1. A construction for inflating a vehicle tire, a casing having an expansion-chamber for air, reducing-valve mechanism governing the admission of air to said chamber, a nozzle having an outlet, said casing having a passage leading from said expansion-chamber to said out-let, an opening in one side of said passage leading to the atmosphere, a piston located in said passage and normally closing said opening, a spring interposed between said piston and an end wall of said passage, said piston having a restricted opening therethrough of less area than that through the valve of the vehicle tire; said piston also having a check-valve controlled passage, said check-valve being normally closed but adapted to open when the air pressure is greater on the inlet side of the piston than on the outlet side thereof.

2. A construction for inflating a vehicle tire, comprising a casing having an expansion-chamber for air, reducing-valve mechanism governing the admission of air to said chamber, a nozzle having an outlet, a cylindrical passage in said casing having a valve-seat formed at one end thereof, a valve for said passage having a valve-stem which extends therethrough, mens carried by the nozzle adapted to abut the end of said valve-stem to open said valve, a piston in said cylindrical passage having a central bore through which said valve-stem slides in close relation, said piston having a restricted opening therethrough, said cylindrical passage having an outlet in one side thereof opening to the atmosphere, and a helical spring interposed between said piston and an end wall of said passage to hold the piston in its normal position over said opening.

3. A construction for inflating a vehicle tire, comprising a casing having an expansion-chamber for air, reducing-valve mechanism governing the admission of air to said chamber, a nozzle having an outlet, said casing having a passage leading from said expansion-chamber to the outlet, an opening in one side of said passage leading to the atmosphere, a piston located in said passage and normally closing said opening, a spring interposed between said piston and an end wall of said passage, said piston having a restricted opening therethrough of less area than that through the valve of the vehicle tire.

In testimony whereof I have affixed my signature.

SIDNEY M. WEISBERG.